Figure 1:
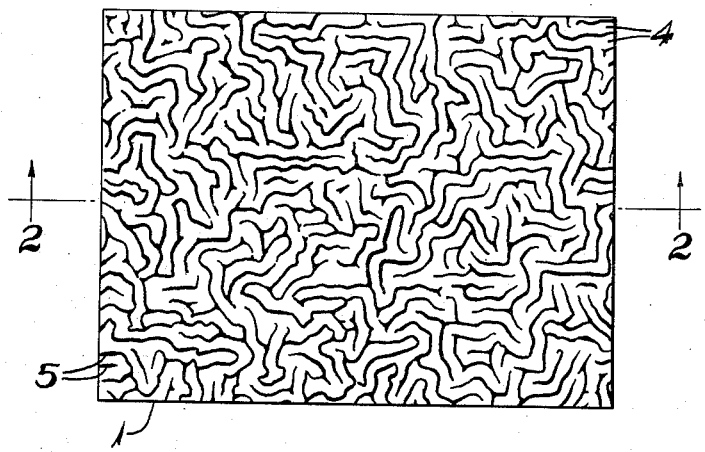

Aug. 26, 1958   O. R. SMITH ET AL   2,849,332
WRINKLE COATING COMPOSITION, ARTICLE AND METHOD
Filed Aug. 24, 1955

INVENTORS
OREAL R. SMITH
JOHN E. POWELL JR
BY
ATTY.

2,849,332

WRINKLE COATING COMPOSITION, ARTICLE AND METHOD

Oreal R. Smith, Lorain, and John E. Powell, Jr., Lakewood, Ohio, assignors to The B. F. Goodrich Company, New York, N. Y., a corporation of New York Application August 24, 1955, Serial No. 530,305

29 Claims. (Cl. 117—41)

This invention relates to novel thermoplastic wrinkle finish coatings. In particular, this invention relates to compositions of matter useful in forming wrinkle finishes and comprising haloethylene polymers such as polyvinyl chloride and the like, to articles of manufacture having wrinkle finish coatings of such compositions and to methods of utilizing such compositions to form wrinkle finish coatings on base materials.

In the past, wrinkle finish coatings of vinyl chloride polymers and other haloethylene polymers have been obtained by calendering the plasticized polymer into film or sheet form and embossing the heated film with a roll, having an offset surface to give a wrinkle finish, against an adhesive coated or primed metal base. During the embossing the film flows and fuses to take the design of the rolls. Alternatively, the film can be deposited on the adhesive-coated metal base. The assembly is then placed in an embossing mold which has a die cut to give a wrinkle finish on pressing, hot pressed in a platen press and cooled in the mold. The resulting wrinkle finish vinyl-coated metal article has a surface equal to or better than that obtained using conventional wrinkle finish enamels, varnishes and so forth and, of course, is superior to these conventional finishes in abrasion resistance, toughness, weathering, and the like. The wrinkle finish vinyl-coated metal part can then be used as such or placed in a press and formed into the desired shape. A feature of the use of such coatings is that during the forming step the wrinkle finish is not destroyed.

However, vinyls are expensive and the equipment required to emboss or press a design on such surfaces is also expensive and increases the cost of the resulting wrinkle finished coatings as compared to conventional finishes. In many instances the equipment cost is prohibitive to small concerns that produce plastic items. Moreover, post-forming of vinyl clad metal requires accurate control of coating thickness since a close tolerance is needed between the coated metal parts and the forming dies.

While it is known that primarily vinyl chloride type polymers have been used in the form of plastisols, plastigels, and organosols for some time to obtain vinyl-coated articles by spread-coating and the like, which require relatively inexpensive equipment and little handling, it has not been possible heretofore to obtain directly wrinkle finishes using these compositions or methods. Vinyl plastisols, thus, would be highly useful where embossing would be mechanically impractical or economically unsound. They would be especially useful in coating preformed objects and in the continuous coating of sheet and similar materials. Accordingly, it is a primary object of the present invention to provide a relatively inexpensive, novel method for obtaining wrinkle finish vinyl coatings on base materials and which avoids the difficulties alluded to in the prior art.

It is another object of the present invention to provide a method for obtaining wrinkle finish vinyl coatings, films, sheets and so forth by a simple process of casting, dipping, roller coating, spraying, spread coating and the like.

Yet another object of this invention is to provide a vinyl composition which can be readily cast, spread-coated and the like on base materials to obtain a wrinkle finish coating after fusing.

A further object is to provide a vinyl composition which can be cast, spread, sprayed and so forth and fused to form films and sheets exhibiting a wrinkle finish.

A still further object is to provide an article of manufacture comprising a base material and a vinyl coating exhibiting a wrinkle finish.

Yet again an object of this invention is to provide fused films and sheets of a vinyl composition having a wrinkled surface condition.

Figure 2:
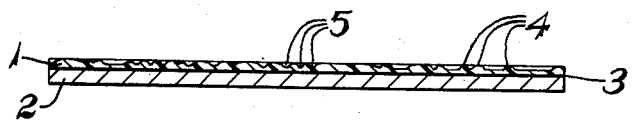

These and other objects and advantages of the present invention will become more apparent to those skilled in the art from the following detailed description, examples and drawing in which Fig. 1 is an enlarged top plan view of an article of manufacture having a wrinkle finish or surface of the plastic made according to this invention and Fig. 2 is a vertical sectional view along the line 2—2 of Fig. 1.

It has now been discovered that wrinkle finishes may be obtained directly on fusing a plasticized haloethylene polymer formulation containing a minor amount of a compatible reactive polyolefinic material. As shown in Figures 1 and 2 of the drawing, a fine wrinkle finish coating 1 is obtained on a metal base plate 2 by the method of the present invention. The numeral 3 indicates that an adhesive layer exists between the coating and the base. The hills 4 and valleys 5 of the coating are clearly and distinctly exhibited by the fused polymer.

The polyolefinic material used with the haloethylene-containing polymer must be compatible with the polymer, that is, it must readily mix with the polymer when forming plastisols, should not migrate or bleed from the polymer after fusing, and should form a homogeneous appearing plastic with the polymer after fusing. Moreover, it should contain at least two double bonds, preferably separated by at least two carbon atoms, or reactive groups so that on heating to fusing temperatures or by the action of light or catalysts, it will react to give the wrinkling effect. The polyolefinic material should preferably be a liquid at room temperature, function in part during the mixing and casting steps to plasticize the polymer to aid in forming a plastisol, and afford possibly some plasticizing action after fusion. Examples of such polyolefinic materials useful in forming wrinkle finishes of haloethylene-containing polymers are divinyl benzene, hexaallyl trimethylene trisulfone, methylene bis acrylamide, 1,3,5-triacrylyl triazine, 1,3,5-trimethacryl triazine, isoprene, 3-methyl-1,3 butadiene, 2,3-dimethyl-1,3 butadiene, piperylene and the like.

Polyolefinic materials which are preferred are polyolefinic aliphatic ester compounds such as the compound formed by the reaction of pentenoic acid,

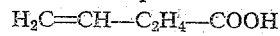
$$H_2C=CH-C_2H_4-COOH$$

and glycerol and the like. Polyolefinic materials which are even more preferred because of their ease in handling and the texture of the resulting finish obtained with them are compounds having the general formula

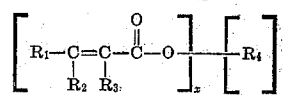

where $R_1$, $R_2$ and $R_3$ are selected from the group consisting of hydrogen and alkyl radicals such as methyl, ethyl, propyl, butyl, amyl, and the like, $R_4$ is aliphatic, and $x$ is an integer having at least the number 2. They are preferably obtained and used as the di-, tri- and other polyolefinic esters of acrylic acid, alkyl acrylic acids, alkyl acrylates, alkyl alkacrylates, and similar compounds of crotonic acid, angelic acid, beta, beta dimethyl acrylic acid and the like having the acrylic grouping

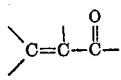

with aliphatic polyhydric alcohols such as ethylene glycol, glycerol, diethylene glycol, tetraethylene glycol, alpha-chloro beta hydroxy propyl alcohol, trimethylene glycol, tetramethylene glycol, pentamethylene glycol, decamethylene glycol, pentaerythritol, sorbitol and so forth. Some specific examples of the more preferred polyolefinic ester compounds are tetraethylene glycol diacrylate, glycerol triacrylate, diethylene glycol diacrylate, tetraethylene glycol dimethacrylate, glycerol trimethacrylate, diethylene glycol dimethacrylate, ethylene glycol dimethacrylate, decamethylene dimethacrylate, diethylene glycol diethacrylate, glycerol triethacrylate, tetraethylene glycol dibutacrylate and the like. In place of the acids or esters used to react with the alcohols to prepare the above complex esters, there may be used the corresponding acid chloride, amide, or hydrazine. Likewise, the corresponding metal salt of the alcohol employed can also be used with an acid chloride. Still other methods can be used to prepare the more preferred polyolefinic ester materials mentioned above. In a given composition the polyolefinic materials can be used singly or in admixture.

The polyolefinic materials are used in a minor amount as compared to the amount of polymer present but sufficient to at least temporarily plasticize the polymer when forming a plastisol and to provide a wrinkle finish on fusing. In general, it has been found best to employ the polyolefinic material in an amount of from about 45 to 75 parts by weight of the polyolefinic material to about 100 parts by weight of the polymer.

The polymeric material used in practice of the present invention includes all of the haloethylene polymers composed predominantly of a polymerized haloethylene having from one to two halogen atoms attached to only one of the carbon atoms, such as homopolymers of vinyl chloride, vinyl bromide, vinyl fluoride, vinylidene chloride, vinylidene bromide and vinylidene fluoride and interpolymers or copolymers of two or more of these monomers. Copolymers or interpolymers made from monomeric mixtures containing at least one haloethylene monomer together with a lesser amount of one or more copolymerizable monoolefinic monomers can also be employed. Monoolefinic materials which can be co- or interpolymerized with the haloethylene monomers include vinyl esters such as vinyl acetate, vinyl chloroacetate, vinyl propionate, vinyl chloropropionate, vinyl butyrate, vinyl benzoate, vinyl chlorobenzoate, and others; acrylic and alpha-alkyl acrylic acids, their alkyl esters, their amides and their nitriles such as acrylic acid, chloro-acrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N-dimethyl methacrylamide, acrylonitrile, chloroacrylonitrile, methacrylonitrile, ethacrylonitrile, and the like; alkyl esters of maleic and fumaric acids such as dimethyl maleate, diethyl maleate, and others; vinyl aromatic compounds such as styrene, dichlorostyrene, vinyl naphthalene, and others; vinyl alkyl ethers and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone, etc.; and in addition other monoolefinic materials such as vinyl pyridine, N-vinyl carbazole, N-vinyl pyrrolidone, ethyl methylene malonate, isobutylene, ethylene, trichloroethylene, and various other readily polymerizable compounds containing a single olefinic double bond, especially those containing the $CH_2=<$ group. When utilizing interpolymers or copolymers, the proportions of the various monomers in the monomeric mixtures polymerized to give the interpolymer may be varied considerably as long as the haloethylene monomer constitutes at least above 50% by weight of the total. For example, there may be used copolymers of from above 50 to 99%, or more preferably from 70 to 95%, by weight of the haloethylene monomer together with from 1 up to below 50%, more preferably from 5 to 30%, by weight of a vinyl ester, or an acrylic or methacrylic ester or any of the other monoolefinic materials mentioned above, or any two, three, four, etc., of these. Tripolymers of from 50 to 90% by weight of vinyl chloride, from 5 to 45% by weight of vinylidene chloride, and from 5 to 45% by weight of a vinyl ester such as vinyl acetate or vinyl benzoate, or an acrylic or methacrylic ester are examples of polymers which may be used. Of the various polymers disclosed herein those composed of a vinyl halide, especially vinyl chloride, and of a predominant amount of a vinyl halide and a minor amount of a vinylidene halide, especially copolymers of a predominant amount of vinyl chloride and a minor amount of vinylidene chloride and blends of these polymers and copolymers are preferred. Blends or mixtures of the foregoing homopolymers, copolymers and interpolymers can also be used. The polymer should be in the form of powder which may be somewhat porous prior to mixing with plasticizer to obtain plastisols, plastigels or organosols.

Conventional plasticizers are employed with the composition herein disclosed to give the required degree of flexibility to or to improve the flexibility of the resulting fused wrinkle finish polymeric haloethylene coating, film or sheet and to aid in the formation of plastisols and the like. Suitable plasticizers are octyl diphenyl phosphate, tricresyl phosphate, tributoxy ethyl phosphate, dioctyl adipate, dioctyl azelate, dioctyl phthalate, dicapryl phthalate, dibutyl phthalate, hexachloro-diphenyl oxide, toluene sulfonamidealdehyde resin, epoxidized long chain fatty acids, a composition such as a mixture of a water-insoluble thermoplastic cellulose ether, di(4-tertiary butyl phenyl) monophenyl phosphate and di(4-tertiary butyl phenyl) mono(5-tertiary butyl-2-xenyl) phosphate, etc. Still other plasticizers can be used such as the ester type plasticizers some of which are resinous or of varying viscosity and molecular weight, for example, the paraplexes and monoplexes, G–25, G–60, G–62, S–71 and the like, made by the Rohm and Haas Company. Mixtures of plasticizers can be used. The plasticizers are used in minor amounts in the composition as compared to the amount of the polymer or of the polyolefinic wrinkle finish forming agent present. Accordingly, the conventional plasticizer is used in the composition in an amount of from about 5 to 40 parts by weight of about 100 parts by weight of the haloethylene containing polymer although these proportions can be varied somewhat without significantly altering the results obtained.

To further improve the texture, the hardness or softness, the processing time and handling of the composition, monoolefinic acrylate monomer materials may be added to the composition. These materials are preferably liquid and may have a relatively low vapor pressure so that a portion of the monoolefinic material may vaporize during the fusion step. Examples of useful materials for this purpose are methyl acrylate, ethyl acrylate, butyl acrylate, octyl acrylate, methyl methacrylate, ethyl methacrylate, methyl ethacrylate, and the like. They have the formula

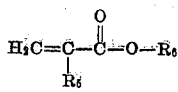

where $R_5$ is a radical selected from the group consisting of hydrogen and alkyl radicals and $R_6$ is an alkyl radical. Mixtures of these monoolefins may be employed. They are used in an amount of from about 1 to 10 parts by weight per 100 parts by weight of the haloethylene-containing polymer.

The polymeric haloethylene compositions described herein may also contain minor amounts of suitable inhibitors and/or stabilizers such as basic lead carbonate, lead oxide, alkaline earth silicates, hydroquinone, lead silicate, lead stearate, titanium dioxide, lead phenolate, aromatics containing phenolic and amino groups and the like. Such materials are also especially desirable to employ where the conventional plasticizer does not also function as an inhibitor and/or stabilizer and where the composition contains traces of catalyst, occluded air or oxygen which would tend to destroy the plastisol, cause too rapid polymerization of the monomers, etc., although it will be understood that catalysts may be added if desired to initiate or to speed the reaction of the polyolefinic material. These stabilizers are preferably used in an amount of from about 0.1 to 10 parts by weight per 100 parts by weight of haloethylene-containing polymer. The inhibited and/or stabilized plastisol, organosol and plastigel compositions of this invention have a very useful shelf-life as they can be stored for almost a month before use. Moreover, the films and sheets fused from these compositions do not exhibit any break-down or discoloration over an extended period of time.

Other suitable compounding ingredients for the haloethylene polymers may be incorporated in the composition such as extenders, fillers, dyes, color pigments, metal particles, fungicides, germicides, minor amounts of rubbary polymers such as a copolymer of about 55 to 70% butadiene-1,3 and the balance acrylonitrile, and the like.

When making plastisols and liquid-like masses, the temperature during mixing of the components of the composition should be below the gel point and preferably not above room temperature, about 25° C., to provide a liquid or pourable composition having a viscosity of from about 200 to 40,000 centipoises and up to as high as 130,000 centipoises. Moreover, it is also preferable to ink mill or similarly treat the plastisol before it is spread and fused to increase the definition and number of the wrinkles produced. Ink milling is believed to result in more intimate contact among the components of the composition and to improve the dispersion or wettability of the polymer for the other components of the composition.

Organosols are prepared by adding a minor amount, 10 to 50%, or more by weight based on the weight of the plastisol or total solids of a volatile organic diluent to the plastisol composition or by replacing part of the conventional plasticizer with diluent. Examples of useful materials for forming organosols are mineral spirits, toluene and the like. Organosols are more fluid than plastisols and are desirable to use where increased fluidity is indicated or where some penetration of the base or support material is required. Organosols may be used to prepare a wrinkle finish film or sheet in the same manner as shown herein with respect to plastisols allowing sufficient time during the heating step to permit evaporation of diluent vapors.

Plastigels are obtained by adding a thickening agent such as a metallic soap to the plastisol compositions. Examples of such soaps are sodium stearate, calcium stearate, aluminum distearate, lithium distearate, magnesium stearate, and lithium hydroxy stearate. Generally, from 5 to 10 parts by weight of the soap are used for every 100 parts by weight of the plastisol composition. The plastigels are putty-like masses at room temperature; they are plastisols with a significant yield point, can be a very fluid mixture, e. g., a non-drip dipping compound or a non-fabric penetrating coating compound and can also be used to obtain a wrinkle finish.

After the plastisol, organosol, or plastigel has been prepared, it can be spread to the desired thickness onto the surface of a metal base which has previously been cleaned of dirt, grease and the like, primed with an adhesive or cement, such as a phenolic aldehyde and butadiene-acrylonitrile adhesive composition, and dried. Other adhesive systems can be used, for example, the metal can be coated with a first layer of a composition comprising a halogenated rubber or a composition comprising a rubbery butadiene-acrylonitrile copolymer, a vinyl chloride-vinylidine chloride copolymer and a polymer comprising from about 70–95% by weight of vinyl chloride, from ½–10% by weight of a monomer of the class consisting of alpha, beta unsaturated dicarboxylic acids and alpha, beta unsaturated dicarboxylic acid anhydrides and from 4–25% by weight of vinyl acetate and a second layer of a composition of a rubbery butadiene-acrylonitrile copolymer or a composition of a rubbery butadiene-acrylonitrile copolymer and a vinyl chloride-vinylidene chloride copolymer prior to applying the wrinkle finish composition of the present invention. In some instances the halogenated rubber composition layer or the butadiene-acrylonitrile copolymer and vinyl chloride-vinylidene chloride copolymer composition layer can be omitted. Still other adhesives known to the art can be used. While adhesives are generally employed, in some instances they may not be necessary especially where the surface may be etched, porous, etc., to obtain a mechanical type adhesion.

The plastisol coating on the primed metal base can then be fused at normal haloethylene polymer fusing temperatures of about 300 to 350° F. for up to 10 minutes or more to obtain a wrinkle finish and cooled. Times for fusing will vary somewhat with the film thickness. Also, the plastisol can be fused at higher temperatures, up to 500° F., but the times required for fusing will be relatively shorter. Moreover, it has been found that the size of the wrinkles can be varied somewhat by varying the fusion temperature or the thickness of the coating of the plastisol, etc., to thereby afford considerable leeway in the texture of the fused coating. The size and number of wrinkles can also be varied by ink milling the plastisol as shown above or by varying the relative proportions of polymer, polyolefinic material and plasticizer.

Instead of spreading the plastisol on a metal base, it can be spread onto a wood, glass, or other base such as those of synthetic materials. The base materials can be solid or porous, and can be smooth or corrugated.

Moreover, the plastisol, etc., can also be spread onto a cloth base and treated as described above. The cloth base or support is usually heated to cause the non-wrinkling surface of the fused film to adhere securely to the support. Adhesives such as polyvinyl lactices, mixtures of polyvinyl chloride and butadiene-1,3-acrylonitrile copolymers dispersed in aqueous media or dissolved in organic solvents, can also be used if desired to aid in securing the film to the support. After applying the adhesive to the support, it can be dried if desired before the polymer is applied. The supporting base can be a matted or unwoven material and the like or a woven material such as an open mesh, stretchable fabric. Other fabrics such as twills and drills can be used. These materials can be made of cotton, wool, cellulose, linen or synthetic fibers, etc., or mixtures thereof, and can be sized or unsized.

In place of spreading the plastisol or other composition directly onto an adhering base or support, the plastisol can be spread onto an unprimed or nonadhesive metal belt or other support, fused and stripped from the belt. Alternatively, it can be picked up by a heated roller partly immersed in a bath of the composition and stripped from the roller after fusing. These films and sheets having a wrinkle finish can be used as such or can be applied to metal or other base by using an adhesive, by heating the non-wrinkled surface momentarily to cause fusion and to secure the film to the base, and/or by passing through a rubber laminating roll. The films can also be coated on the non-wrinkle finish side with adhesives such as with pressure-sensitive adhesives and used as wrinkle finish haloethylene polymer backed pressure-sensitive adhesive films, sheets or tapes.

Furthermore, two films or sheets having wrinkle finish surfaces prepared according to the teaching of the present invention can be cemented together on their untreated sides, or, if desired, a base or support material can be interposed between them to provide a laminated structure. Where the composition has been spread and fused to one side of a base as disclosed herein, another composition can be spread onto the untreated side of the base and then processed as disclosed herein, care being taken to avoid heating times and temperatures which might destroy the original wrinkle finish surface.

In any of the foregoing methods for providing a coating, film or sheet of the present composition, it is understood that similar coatings can be formed by casting, by allowing the composition to flow over a substrate, by dipping, by roller coating, by spraying, etc.

The novel wrinkle finish coating of the present invention can subsequently be printed if desired. It can also be embossed to form novel designs by altering or destroying a part of the finish although it will be appreciated that a particular object of this invention is to avoid embossing in the formation of the wrinkle finish itself. If desired, the fused wrinkle finish haloethylene polymer can be made porous by mechanically punching, etc., holes in the polymer or by incorporating salt or other soluble substance in the plastisol and the like prior to fusing and then washing after the fusing step to remove the salt.

The novel wrinkle finish obtained using the composition herein disclosed has a surface appearance equal to or better than that exhibited by conventional enamels and varnishes and is similar in appearance to that obtained by hot pressing or embossing a conventional plasticized haloethylene-containing polymer composition. The coatings, etc., can be glossy or dull, transparent or pigmented depending on the particular composition used. Moreover, the present coating is superior to enamel or varnish wrinkle finishes in abrasion resistance, tear, toughness and weatherability.

While it is not precisely known how the wrinkle finish is formed, it is believed that during fusing the polyolefinic material cross-links or polymerizes by means of the double bonds present to cause a shrinkage or distortion of the plasticized polymer chains. Condensation may also occur. Moreover, when a monoolefinic material is added, the reaction time appears to be increased so that the monoolefinic material may be entering into the cross-linking or polymerization reaction or it may possibly act only as a temporary plasticizer. It may also be possible that there are some residual double bonds in the haloethylene-containing polymer either from incomplete polymerization or loss of hydrogen halide by decomposition and that these double bonds serve as points for the polyolefinic material to cross-link or to co- or interpolymerize with the polymer. However, whatever may be the true explanation of the phenomena observed herein, it has been found that unless a polyolefinic material is employed as described herein, preferably in conjunction with a monoolefinic material, with a plasticized haloethylene-containing composition a wrinkle finish surface will not be produced on fusing the composition.

The following examples will serve to illustrate the invention with more particularity to those skilled in the art:

*Example I*

A plastisol was prepared by mixing together about 100 parts by weight of powdered polyvinyl chloride, 30 parts by weight of Paraplex G–25 plasticizer (a resinous ester-type plasticizer made by the Rohm and Haas Company), 66 parts by weight of tetraethylene glycol dimethacrylate and a very small amount of lithol Red Toner in a Hobart mixer at 25° C. for 30 minutes to form a plastisol. The plastisol was then passed through an ink mill three times. A piece of cold rolled steel sheet was then cleaned, degreased and primed with Stanley adhesive 40×415 (apparently a phenolic/aldehyde resin-butadiene acrylonitrile copolymer mixture in a solvent) and dried by baking for 10 minutes at 350° F. The ink-milled plastisol was then spread-coated onto the dried adhesive-coated steel sheet to a thickness of about 10 mils and fused at 350° F. for 8 minutes. The resulting reddish film was flexible, glossy and hard and its surface was entirely covered with a maze of fine interconnected wrinkles.

*Example II*

This example was the same as Example I, above, except the plastisol composition comprised the following:

| Components: | Parts by weight (approx.) |
|---|---|
| Powdered polyvinyl chloride | 100 |
| Tetraethylene glycol dimethacrylate | 55 |
| Monoplex S–71 (an ester-type plasticizer-stabilizer of low viscosity made by the Rohm and Haas Company) | 10 |
| Butyl acrylate | 5 |

After fusing for 8 minutes at 350° F. a transparent, hard, glossy film was produced having a wrinkle finish similar to that exhibited by the film of Example II except that the wrinkles were bigger and more pronounced and the film itself was transparent.

In summary, the present invention teaches that wrinkle finish haloethylene-containing polymeric films, sheets and coatings on various articles can readily be obtained by incorporating in the plasticized polymeric composition a minor amount of a compatible reactive polyolefinic material as compared to the amount of polymer present, forming a film of the composition and fusing. Preferably, the composition should also contain a minor amount of a monoolefinic monomer to aid in the formation of the wrinkle finish. The compositions disclosed herein are stable and have a useful shelf-life so that they do not need to be employed immediately after preparation and, thus, lend themselves well to factory scheduling. Moreover, the wrinkles of the films can be varied in size, depth and number by varying coating thickness, fusion temperatures, mixing procedures and the ratio of the components of the composition to themselves. This lends flexibility to the process and composition so that various wrinkle finishes can be obtained depending on the needs of the user or on the articles to be produced. This flexibility provides a great advantage over conventional processes employing embosing rolls or dies since the great expense entailed in cutting dies of various depth and design is avoided thereby materially reducing costs of obtaining haloethylene polymer wrinkle finish films or coatings on base materials. The present invention also eliminates the embossing equipment, molds and dies required with conventional processes, can be applied to preformed articles and is readily adaptable to continuous production processes. The composition of the present invention will find utility as upholstery material for furniture and the like, as a book-binding material, as coatings on metal desk or chair parts, metal cabinets, machine cabinets, stands and other parts, typewriter frames, etc., and wherever a hard, tough, wear-resistant and weather-resistant haloethylene polymer wrinkle finish coating material is needed, especially where low or nonreflective coatings are desired such as on instrument panels and dashboards of automobiles, airplanes, etc.

What is claimed is:

1. A plastic, fusible, wrinkle finish forming composition of matter comprising as essential wrinkle finish components a major amount of a polymer of a monomeric material in which each constituent contains a single olefinic double bond and in which the predominant monomer is a haloethylene having from 1 to 2 halogen atoms on only one carbon atom, a minor amount of a plasticizer for said haloethylene-containing polymer and a minor amount of a compatible reactive polyolefinic monomer, containing at least two double bonds separated by at least two carbon atoms, the amount of said plasticizer being less than the amounts of said polymer and of said polyolefinic monomer.

2. A plastic, fusible, wrinkle finish forming composition of matter comprising as essential wrinkle finish components, in the following relative proportions, about 100 parts by weight of a polymer of a monomeric material in which each constituent contains a single olefinic double bond and in which the predominant monomer is a haloethylene having from 1 to 2 halogen atoms on only one carbon atom, from about 45 to 75 parts by weight of a material compatible with said polymer and having the general formula

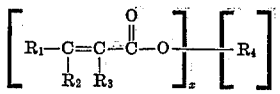

where $R_1$, $R_2$ and $R_3$ are radicals selected from the group consisting of hydrogen, methyl, ethyl, propyl, butyl and amyl radicals, $R_4$ is aliphatic and $x$ is an integer having at least the number 2, and from about 5 to 40 parts by weight of a plasticizer for said haloethylene-containing polymer.

3. A composition of matter according to claim 2 containing additionally prior to being fused from about 1 to 10 parts by weight of a monoolefinic acrylate monomer having the general formula

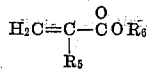

in which $R_5$ is a radical selected from the group consisting of hydrogen and an alkyl radical having from 1 to 2 carbon atoms and $R_6$ is an alkyl radical having from 1 to 8 carbon atoms.

4. A composition of matter according to claim 3 in which said composition is an ink milled plastisol.

5. An ink milled, fusible, wrinkle finish forming plastisol comprising as essential wrinkle finish components about 100 parts by weight of polyvinyl chloride, about 55 parts by weight of tetraethylene glycol dimethacrylate, about 10 parts by weight of a low viscosity liquid ester plasticizer-stabilizer, and about 5 parts by weight of butyl acrylate.

6. An article of manufacture comprising a film, sheet and the like of a plastic material having a wrinkle finish surface and comprising the reaction product of a composition comprising as essential wrinkle finish components a major amount of a polymer of a monomeric material in which each constituent contains a single olefinic double bond and in which the predominant monomer is a haloethylene having from 1 to 2 halogen atoms on only one carbon atom, a minor amount of a plasticizer for said haloethylene-containing polymer, and a minor amount of a compatible reactive polyolefinic monomer containing at least two double bonds separated by at least two carbon atoms, the amount of said plasticizer being less than the amounts of said polymer and of said polyolefinic monomer.

7. An article of manufacture comprising a base material and secured thereto a flexible, hard, tough, wear-resistant and weather-resistant coating of a fused plastic material having a wrinkle finish surface on said base of a composition comprising as essential wrinkle finish components, in the following relative proportions, about 100 parts by weight of a polymer of a monomeric material in which each constituent contains a single olefinic double bond and in which the predominant monomer is a haloethylene having from 1 to 2 halogen atoms on only one carbon atom, from about 45 to 75 parts by weight of a material compatible with said polymer and having the general formula

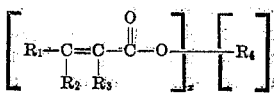

where $R_1$, $R_2$, and $R_3$ are radicals selected from the group consisting of hydrogen, methyl, ethyl, propyl, butyl and amyl radicals, $R_4$ is aliphatic and $x$ is an integer having at least the number 2, and from about 5 to 40 parts by weight of a plasticizer for said haloethylene-containing polymer.

8. An article of manufacture according to claim 7 in which said composition contains additionally prior to being fused from about 1 to 10 parts by weight of a monoolefinic monomer having the general formula

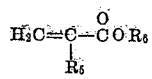

where $R_5$ is a radical selected from the group consisting of hydrogen and an alkyl radical having from 1 to 2 carbon atoms and $R_6$ is an alkyl radical having from 1 to 8 carbon atoms.

9. An article of manufacture according to claim 8 in which said composition is an ink milled plastisol.

10. An article of manufacture comprising a base material and adherent thereto, by means of an interposed layer of an adhesive, a flexible, hard, tough, wear-resistant and weather-resistant coating of a plastic material having a wrinkle finish surface of a fused composition comprising as essential wrinkle finish components, in the following relative proportions, about 100 parts by weight of a polymer of a monomeric material in which each constituent contains a single olefinic double bond and in which the predominant monomer is a haloethylene having from 1 to 2 halogen atoms on only one carbon atom, from about 45 to 75 parts by weight of a material compatible with said polymer and having the general formula

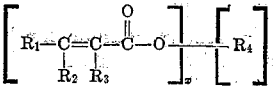

where $R_1$, $R_2$, and $R_3$ are radicals selected from the group consisting of hydrogen, methyl, ethyl, propyl, butyl and amyl radicals, $R_4$ is aliphatic and $x$ is an integer having at least the number 2 and from about 5 to 40 parts by weight of a plasticizer for said haloethylene-containing polymer.

11. An article of manufacture according to claim 10 in which said composition contains additionally prior to being fused from about 1 to 10 parts by weight of a monoolefinic monomer having the general formula

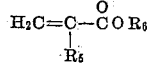

where $R_5$ is a radical selected from the group consisting of hydrogen and an alkyl radical having from 1 to 2 carbon atoms and $R_6$ is an alkyl radical having from 1 to 8 carbon atoms.

12. An article of manufacture according to claim 11 in which said composition is an ink milled plastisol.

13. An article of manufacture comprising a metal base member, and adhered thereto by means of a layer of an adhesive comprising a phenolic-aldehyde resin and a butadiene-acrylonitrile copolymer, a flexible, hard, tough, wear-resistant and weather-resistant coating of a plastic material having a wrinkle finish surface of a fused composition comprising an ink milled plastisol containing as essential wrinkle finish components about 100 parts by weight of polyvinyl chloride, about 55 parts by weight of tetraethylene glycol dimethacrylate, about 10 parts by weight of a low viscosity liquid ester plasticizer-stabilizer and about 5 parts by weight of butyl acrylate.

14. The method which comprises mixing together to form a composition, characterized by being plastic and by forming wrinkle finishes on fusing and comprising the following essential wrinkle finish components, a major amount of a polymer of a monomeric material in which each constituent contains a single olefinic double bond and in which the predominant monomer is a haloethylene having from 1 to 2 halogen atoms on only one carbon atom, a minor amount of a plasticizer for said haloethylene-containing polymer and a minor amount of a compatible reactive polyolefinic monomer containing at least two double bonds separated by at least two carbon atoms, the amount of said plasticizer being less than the amounts of said polymer and of said polyolefinic monomer, depositing said composition as a layer on a substrate, and fusing the same.

15. The method which comprises mixing together to form a plastic, fusible, wrinkle finish forming composition, comprising the following essential wrinkle finish components in the following relative proportions, about 100 parts by weight of a polymer of a monomeric material in which each constituent contains a single olefinic double bond and in which the predominant monomer is a haloethylene having from 1 to 2 halogen atoms on only one carbon atom, from about 45 to 75 parts by weight of a material compatible with said polymer and having the general formula

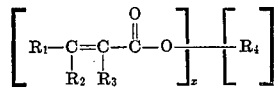

where $R_1$, $R_2$ and $R_3$ are radicals selected from the group consisting of hydrogen, methyl, ethyl, propyl, butyl and amyl radicals, $R_4$ is aliphatic and $x$ is an integer having at least the number 2, and from about 5 to 40 parts by weight of a plasticizer for said haloethylene-containing polymer, depositing said composition as a layer on a substrate and heating said layer for a time and at a temperature sufficient to fuse said layer to form a wrinkle finish film, sheet and the like.

16. The method which comprises mixing together to form a plastic, fusible, wrinkle finish forming composition, comprising the following essential wrinkle finish components in the following relative proportions, about 100 parts by weight of a polymer of a monomeric material in which each constituent contains a single olefinic double bond and in which the predominant monomer is a haloethylene having from 1 to 2 halogen atoms on only one carbon atom, from about 45 to 75 parts by weight of a material compatible with said polymer and having the general formula

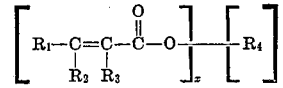

where $R_1$, $R_2$ and $R_3$ are radicals selected from the group consisting of hydrogen, methyl, ethyl, propyl, butyl and amyl radicals, $R_4$ is aliphatic and $x$ is an integer having at least the number 2, and from about 5 to 40 parts by weight of a plasticizer for said haloethylene-containing polymer, depositing said composition as a coating on a base material and heating said coating for a time and at a temperature sufficient to fuse said coating to said base to form an adherent, flexible, hard, tough, wear-resistant and weather-resistant wrinkle finish coating on said base.

17. The method which comprises mixing together to form a plastic, fusible, wrinkle finish forming composition, comprising the following essential wrinkle finish components in the following relative proportions, about 100 parts by weight of a polymer of a monomeric material in which each constituent contains a single olefinic double bond and in which the predominant monomer is a haloethylene having from 1 to 2 halogen atoms on only one carbon atom, from about 45 to 75 parts by weight of a material compatible with said polymer and having the general formula

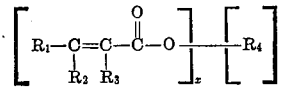

where $R_1$, $R_2$ and $R_3$ are radicals selected from the group consisting of hydrogen, methyl, ethyl, propyl, butyl and amyl radicals, $R_4$ is aliphatic and $x$ is an integer having at least the number 2, and from about 5 to 40 parts by weight of a plasticizer for said haloethylene-containing polymer, depositing said composition as a coating on the adhesive surface of an adhesive primed base material and heating said coating for a time and at a temperature sufficient to fuse said coating to said base to form an adherent, flexible, hard, tough, wear-resistant and weather-resistant wrinkle finish coating on said base.

18. The method according to claim 17 in which said composition contains additionally prior to being fused from about 1 to 10 parts by weight of a monoolefinic monomer having the general formula

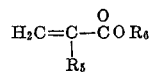

where $R_5$ is a radical selected from the group consisting of hydrogen and an alkyl radical having from 1 to 2 carbon atoms and $R_6$ is an alkyl radical having from 1 to 8 carbon atoms.

19. The method according to claim 18 in which said composition is a plastisol and which contains the additional step of ink milling said plastisol before depositing it as a coating on said adhesive primed base material.

20. The method which comprises mixing together to form a plastisol characterized by forming wrinkle finishes on fusing and comprising the following essential wrinkle finish components, about 100 parts by weight of polyvinyl chloride, about 55 parts by weight of tetraethylene glycol dimethacrylate, about 10 parts by weight of a low viscosity liquid ester plasticizer-stabilizer and about 5 parts by weight of butyl acrylate, ink milling said plastisol, depositing a coating of said plastisol on the adhesive surface of an adhesive primed metal member, said adhesive comprising a phenolic-aldehyde resin and a butadiene-acrylonitrile copolymer, and fusing the same at a temperature and for a time sufficient to fuse said coating to said base to form an adherent, flexible, hard, tough, wear-resistant and weather-resistant wrinkle finish coating on said base.

21. An ink milled, fusible, wrinkle finish forming plastisol comprising as essential wrinkle finish components about 100 parts by weight of polyvinyl chloride, about 66 parts by weight of tetraethylene glycol dimethacrylate and about 30 parts by weight of a resinous ester plasticizer.

22. An article of manufacture comprising a metal base member, and adhered thereto by means of a layer of an adhesive comprising a phenolic-aldehyde resin and a butadiene-acrylonitrile copolymer, a flexible, hard, tough, wear-resistant and weather-resistant coating of a plastic material having a wrinkle finish surface of a fused composition comprising an ink milled plastisol containing as essential wrinkle finish components about 100 parts by weight of polyvinyl chloride, about 66 parts by weight of tetraethylene glycol dimethacrylate, and about 30 parts by weight of a resinous ester plasticizer.

23. The method which comprises mixing together to form a plastisol characterized by forming wrinkle finishes on fusing and comprising the following essential wrinkle finish components about 100 parts by weight of polyvinyl chloride, about 66 parts by weight of tetraethylene glycol dimethacrylate and about 30 parts by weight of a resinous ester plasticizer, ink milling said plastisol, depositing a coating of said plastisol on the adhesive surface of an adhesive primed metal member, said adhesive comprising a phenolic-aldehyde resin and a butadiene-acrylonitrile copolymer, and fusing the same at a temperature and for a time sufficient to fuse said coating to said base to form an adherent, flexible, hard, tough, wear-resistant and weather-resistant wrinkle finish coating on said base.

24. A plastic, fusible, wrinkle finish forming vinyl chloride polymeric composition comprising as essential wrinkle finish forming components a major amount of a vinyl chloride polymer, a polyaliphatic polyacrylate monomer in a minor amount sufficient to wrinkle said composition on fusing, and a plasticizer for said composition in a minor amount less than said polymer and said monomer and at least sufficient to plasticize said composition.

25. A plastic fusible, wrinkle finish forming vinyl-chloride polymeric composition according to claim 24 containing additionally prior to being fused from about 1 to 10 parts by weight per 100 parts by weight of said polymer of a material having the general formula

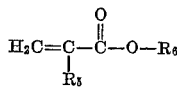

where $R_5$ is selected from the group consisting of hydrogen and alkyl radicals having from 1 to 2 carbon atoms and $R_6$ is an alkyl radical having from 1 to 8 carbon atoms.

26. An article of manufacture comprising a metallic base member and secured thereto a film, sheet and the like of a coating having a wrinkle finish and comprising a fused vinyl chloride polymeric composition comprising as essential wrinkle finish components a major amount of a vinyl chloride polymer, a polyaliphatic polyacrylate monomer in a minor amount sufficient to wrinkle said composition on fusing, and a plasticizer for said composition in a minor amount less than said polymer and said monomer and at least sufficient to plasticize said composition.

27. An article of manufacture according to claim 26 in which said composition contains additionally prior to fusing from about 1 to 10 parts by weight per 100 parts by weight of said polymer of a material having the general formula

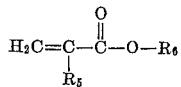

where $R_5$ is selected from the group consisting of hydrogen and alkyl radicals having from 1 to 2 carbon atoms and $R_6$ is an alkyl radical having from 1 to 8 carbon atoms.

28. The method which comprises mixing together to form a vinyl chloride polymeric composition characterized by being plastic and by forming wrinkle finishes on fusing and comprising the following essential wrinkle finish components a major amount of a vinyl chloride polymer, a polyaliphatic polyacrylate monomer in a minor amount sufficient to wrinkle said composition on fusing, and a plasticizer for said composition in a minor amount less than said polymer and said monomer and at least sufficient to plasticize said composition, depositing said composition as a layer in adhering relationship on a metallic substrate, and fusing the same.

29. The method according to claim 28 in which said composition contains additionally prior to fusing from about 1 to 10 parts by weight per 100 parts by weight of said polymer of a material having the general formula

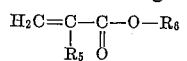

where $R_5$ is selected from the group consisting of hydrogen and alkyl radicals having from 1 to 2 carbon atoms and $R_6$ is an alkyl radical having from 1 to 8 carbon atoms.

References Cited in the file of this patent

UNITED STATES PATENTS

| | | |
|---|---|---|
| Re. 23,212 | Beynon | Mar. 28, 1950 |
| 2,567,719 | Loritsch et al. | Sept. 11, 1951 |
| 2,575,046 | Chavannes et al. | Nov. 13, 1951 |
| 2,618,621 | Burt | Nov. 18, 1952 |